(12) United States Patent
White et al.

(10) Patent No.: US 12,086,267 B2
(45) Date of Patent: Sep. 10, 2024

(54) INDUSTRIAL CYBERATTACK SIMULATION SYSTEM

(71) Applicant: Lawrence Livermore National Security, LLC, Livermore, CA (US)

(72) Inventors: Gregory K. White, Livermore, CA (US); Steven A. Kreek, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 280 days.

(21) Appl. No.: 17/669,097

(22) Filed: Feb. 10, 2022

(65) Prior Publication Data
US 2023/0252160 A1    Aug. 10, 2023

(51) Int. Cl.
*G06F 21/00*    (2013.01)
*G06F 21/57*    (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | |
|---|---|---|
| 9,836,993 B2 | 12/2017 | Dunlop et al. |
| 10,650,700 B2 | 5/2020 | White et al. |
| 2011/0185432 A1 | 7/2011 | Sandoval et al. |
| 2016/0285907 A1* | 9/2016 | Nguyen ............. H04L 63/1433 |
| 2017/0304707 A1* | 10/2017 | Morton ............. A63B 71/0622 |
| 2023/0056233 A1 | 2/2023 | Cyr et al. |

OTHER PUBLICATIONS

International Search Report & Written Opinion mailed May 23, 2023 for International Patent Application No. PCT/US2023/012728.
Le, Tan Duy, et al., "GridAttackSim: A cyber attack simulation framework for smart grids," Electronics 2020, 9, 1218, pp. 1-21.
Osborn, S., et al. "Squirrel (MT-CFAFI 2-Pager)," No. LLNL-TR-829127. Lawrence Livermore National Lab (LLNL), Livermore, CA (United Slates), 2021. Retrieved on Apr. 18, 2023 from <hltps://www.osti.gov/biblio/1830944> entire document.

(Continued)

*Primary Examiner* — Andrew J Steinle
(74) *Attorney, Agent, or Firm* — Perkins Coie LLP

(57) ABSTRACT

A system is provided for simulating a cyberattack as a simulated cyberattack on a real industrial control facility that includes reals sensor devices. The system generates simulated sensor signals that are representative of sensor signals generated by a sensor of a real sensor device that is the target of the simulated cyberattack. The system injects the simulated sensor signals into the real sensor device so that the real sensor device generates an output based on the simulated sensor signals. The system monitors the response of a personnel of the industrial control facility. The system then generates an assessment of the response based on a target response. The system may rerun the simulated cyberattack based on the assessment.

43 Claims, 6 Drawing Sheets

(56) References Cited

OTHER PUBLICATIONS

Stanculescu, Marilena, et al. "A case study of an industrial power plant under cyberattack: Simulation and analysis" Energies 14.9 (2021): 2568. Retrieved on Apr. 18, 2023 (Apr. 18, 2023) from <https://www.mdpi.com/1996-1073/14/9/2568> entire document.

Altschaffel, R., et al., "Nuclear Power Plant in a Box," Otto-von-Guericke University Magdeburg, Germany, retrieved on Oct. 18, 2021, 9 pages.

Larsen, Robert K., "Hypothetical Facility Data Book: The Shapash Nuclear Research Institute (SNRI)," Los Alamos National Laboratory, Aug. 16, 2013, 46 pages.

* cited by examiner

INDUSTRIAL CYBERATTACK SIMULATION SYSTEM

STATEMENT REGARDING FEDERALLY SPONSORED RESEARCH

This invention was made with Government support under Contract No. DE-AC52-07NA27344 awarded by the United States Department of Energy. The Government has certain rights in the invention.

BACKGROUND

Cyberattacks targeting industrial facilities are becoming more common. Some recent examples include a 2015 cyberattack against the power grid in the Ukraine that left thousands of homes without power for several hours and the 2017 Triton cyberattack that injected malware in a Saudi petrochemical plant that allowed hackers to take over the plant's safety instrumentation system. Cyberattacks can have deadly consequences. A cyberattack on a nuclear power facility may lead to the release of radiation, theft of radioactive material, and damage to the core. A cyberattack on a medical facility may result in a medical device delivering the wrong dosage of radiation to a patient or targeting the wrong location within the patient. A cyberattack at a chemical storage facility may result in the release of a dangerous gas near a population center.

Although conventional cyberattacks generally focus on targeting computer systems, such as servers in a cloud data center, company laptops used by employees, or personal computers of the general population, industrial cyberattacks may focus not only on computer systems but also industrial control systems (ICSs). In the case of a nuclear power plant, the ICSs include temperature monitoring devices, radiation detection devices, x-ray devices, cameras, water level control devices, gate control devices, pressure release valves, outlet control devices, and so on.

In the case of a nuclear power plant, several resources are available to assist in training operators in monitoring and plant operations. The resources may include onsite training at a decommissioned or mockup nuclear power plant, training based on simulations, training based on a hypothetical nuclear facility, and so on. A system for training based on simulations is described in the paper entitled "Nuclear Power Plant in A Box" and authored by R. Altschaffel, et al. A hypothetical nuclear facility may describe the locations and characteristics of elements of the nuclear facility such as the reactor building, radioactive waste storage area, and guard tower. The resources are used for training in the overall operation of a nuclear power plant and countering an attack on the information technology (IT) infrastructure. The resources, however, do not assist in cyberattacks on the ICSs.

DETAILED DESCRIPTION

Figure 1:
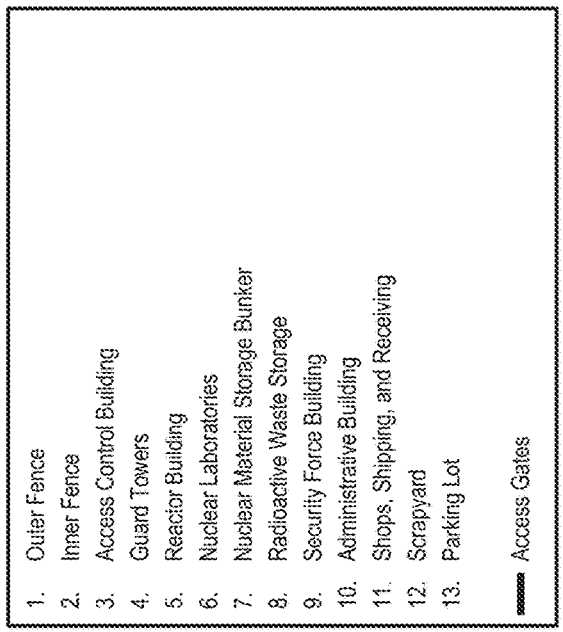
FIG. 1 is a diagram that illustrates the layout of a hypothetical nuclear facility.
Figure 1:
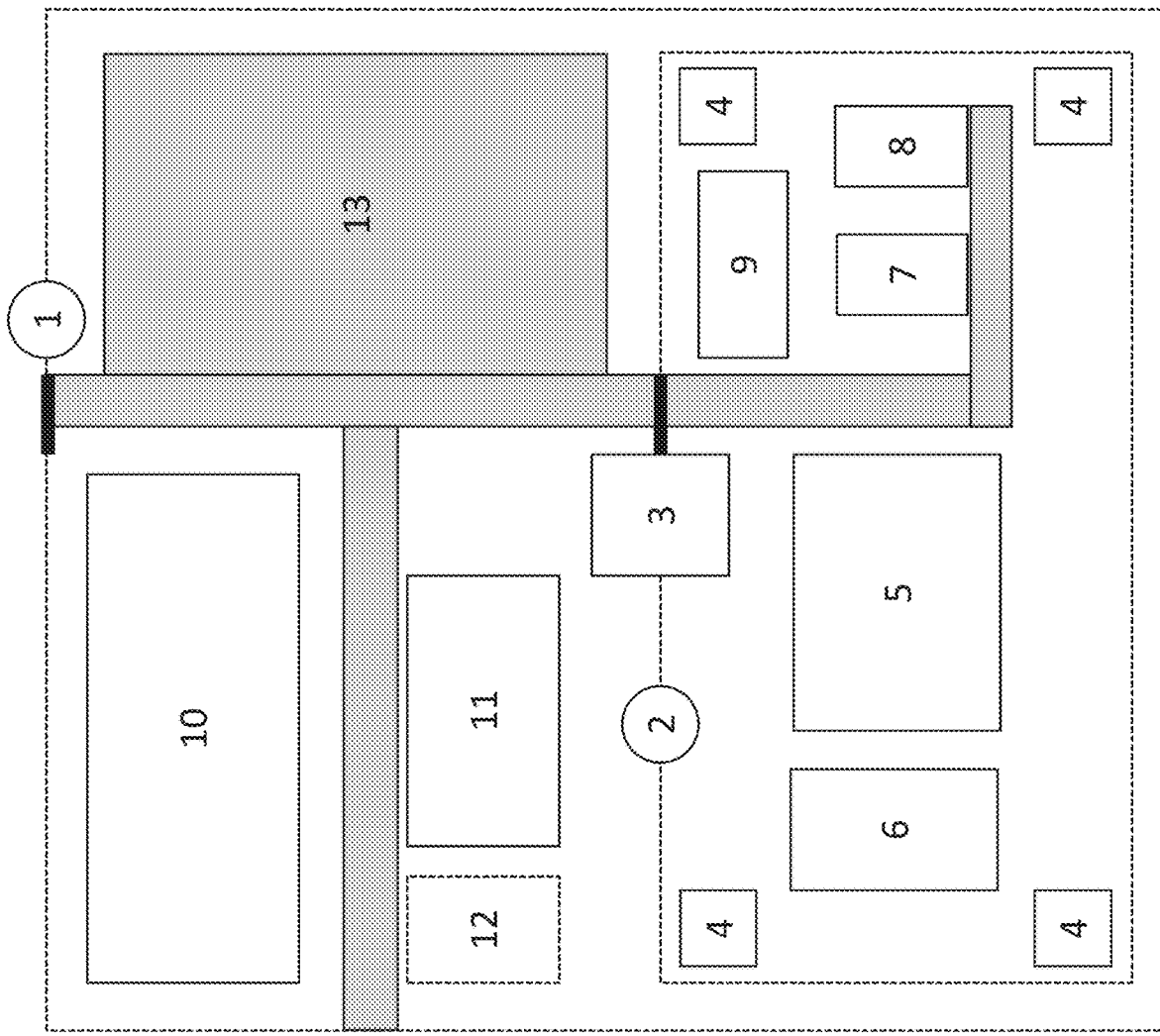

Methods and systems are provided for simulating cyberattacks against an ICS of an industrial facility. In some embodiments, an industrial cyberattack simulation (ICAS) system is provided that simulates cyberattacks against the ICS at a physical facility, at a simulated facility, or a combination of both. At a physical facility, the ICAS system may inject false data directly into an ICS device. For example, a camera at the facility may be modified to receive sensor data either from a real light sensor or a simulated sensor. When false data representing a possible cyberattack is provided via the simulated sensor, false data is used to generate an image that may be sent to an ICS management system that displays the image on an operator console. An operator would not be able to tell from the image itself whether it is based on real data or false data. The operator, however, may be able to identify that the image is inconsistent with data collected from other devices. For example, if false data is supplied to a camera at one end of a hallway but not to a camera at the other end of the hallway, the operator should be able to detect the inconsistency and take a countermeasure or other responsive action. As another example, if false data is an image of an overflow channel showing no overflow, but an overflow device indicates that there is an overflow, the operator should be able to detect the inconsistency.

In addition to injecting false data into sensor and control devices, the ICAS system may inject false data into a network connecting the ICS to the ICS management system of the facility. Continuing with the camera example, the ICAS system may intercept real images collected by the camera and replace them with false images. In such a case, the ICAS system would display the false images on the operator console. To support the intercepting of real data, a computer system may be placed between the ICS and the ICS management system and receive real data sent by the ICS and send false data to the ICS management system. The ICAS system may replace only a subset of the real data with false data. For example, the ICAS system may replace real temperature data with false temperature data but not replace real water level data.

In some embodiments, the ICAS system may interface with the ICS management system but not interface with any real devices. In such a case, the ICAS system may be deployed at a physical facility or at a location that houses just the ICS management system. In such a case, the ICAS system may simulate the underlying physical processes such as distillation or isomerization in a petroleum refinery, generation of coke at a steel mill, transformation of electricity in a power grid, and so on. A system for simulating physical processes for a nuclear power plant is described in Altschaffel.

In some embodiments, the ICAS system allows a trainer to prepare a script for a training exercise. The script may specify various scenarios such as a scenario to inject false data into a camera at one end of a hallway at a certain time and let a camera at the other end send its real data. The scenario may also specify that a person should walk down the hallway. The operator in such a case should detect a discrepancy and take the appropriate a responsive action such as checking for malfunctioning or hacking of a camera. Another scenario may be to inject into a radiation detector at a rail entrance to a facility false data indicating no detection of radiation or an unusual background radiation (when it should be detecting background radiation of a certain signature) as a railcar that is not supposed to be carrying radioactive material is leaving. The scenarios may include timing information indicating when scenarios should be activated. The scenarios may also be augmented with information on false data provided by a person (e.g., a hacker) in real time during training. For example, the person may monitor the operator's actions and inject false data into sensors devices in an attempt to hide a cyberattack on the ICS. A scenario may also specify a target or desired response that an operator should take such as shutting a gate at the rail entrance when the detector data is anomalous.

The ICAS system may also provide a gaming environment for training an operator to detect and respond to a cyberattack. The gaming environment may be based on a 3D model of a facility along with definition of devices, equipment, furniture, computers, and so on that are in the facility. The operator or other trainee (e.g., guard) may move through the gaming environment of the facility to, for example, check on sensors that appear faulty, respond to suspected cyberattacks, interface with equipment, and so on. The gaming environment may be based on various scenarios that may be played automatically, dynamically as selected by a trainer, dynamically in response to an operator's action or inaction, and so on. The gaming environment may be implemented using a gaming engine such as the Unreal Engine provided by Epic Games, Inc. and Amazon Lumberyard provided by Amazon.com, Inc.

In some embodiments, the ICAS system records the user interface (UI) of the ICS management system and the actions that the operator takes. The actions can then be correlated to the different scenarios so that responses of the operator can be analyzed. The recordings can then be replayed to assist the operator in learning the appropriate responses. The ICAS system may also allow certain scenarios to be replayed to assist in the training process.

The ICAS system may also interface with monitoring devices of the ICS. The monitoring devices may include a device that displays sensor readings (e.g., temperature and salinity) received from a sensor device, visual or audio alarms indicating critical conditions, automatic and manual shutoff controls, and so on. The devices may be adapted to allow injection of false data in place of real data. The ICAS system may also provide a UI via a computer display that simulates the "look and feel" of a monitoring device rather than interfacing with a real device. The UI may include images of buttons, switched, readouts, and so on provided by the device.

In some embodiments, the ICAS system may provide simulated control signals to a control device of a facility. For example, a control device may control a shutoff valve in a nuclear facility, a radiation therapy device in a medical facility, a baggage handling system in an airport, a pumpjack at an oil rig, a chemical injection device at a manufacturing facility, and so on. The ICAS system generates simulated control signals that are representative of control signals generated by a control system for controlling a control device of the facility. For example, the control signals may be used to open a shutoff valve, set a radiation dosage level, override a shutoff switch for a baggage conveyor, stop a pumpjack, and inject a wrong chemical. The ICAS system sends the simulated control signals to the control device to simulate the effects of the simulated cyberattack. The simulated control signals may be sent to an input port that receives real control signals or injected via an injection port to replace any real control signals.

In some embodiments, the ICAS system monitors the response of an operator to a simulated cyberattack. For example, a real device may be a portable gas detector that monitors concentration of hydrogen sulfide at a sewage treatment plant. The gas detector may include a display of the concentration. The response of the operator to a dangerously high concentration, for example, may be to do nothing, turn on an exhaust fan immediately, or notify a supervisor. If the operator does nothing, the operator may not even be cognizant of the danger. The notifying of a supervisor may not be an appropriate response because it may delay implementing the needed countermeasure of turning on the exhaust fan. The most appropriate or desired response may be to turn on the exhaust fan immediately.

Another example facility is a sewage treatment plant that intakes a flow of raw sewage, stores the raw sewage in storage tanks, treats the sewage using screens, a comminutor, a grit chamber, a clarifier, an aeration tank, and a pump, and then discharges the treated sewage. Various sensor devices may be used to monitor the treatment such as sensors for detecting when a tank is full, a screen is clogged, or a pump malfunctions. In addition to sensor signals, the ICAS system may send simulated control signals to control devices such as to close an overflow valve of a storage tank, open intake valve of a storage tank, change the speed of a pump, and so on. The ICAS system may also be used to simulate data of a cyberattack that is injected into an electronic device such as a firewall or a mail system (e.g., as a phishing email or a ransomware email) that is part of the ICS management system.

Figure 2:
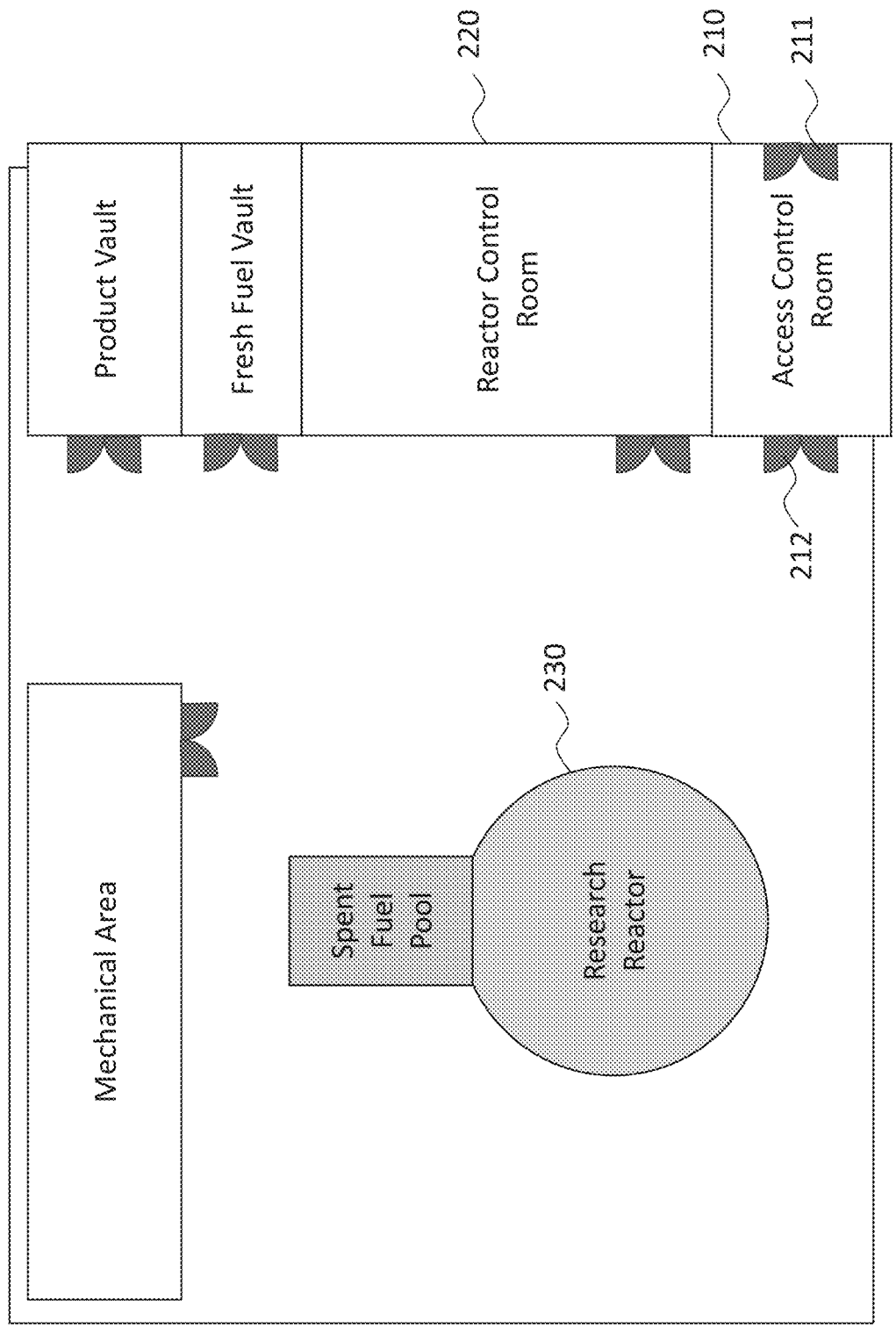
FIG. 2 is a diagram that illustrates the layout of a reactor building and offices of the Shapash hypothetical facility.

FIGS. 1 and 2 are diagrams that illustrate a hypothetical nuclear facility. FIG. 1 represents the layout of the hypothetical nuclear facility. The facility includes areas identified by the legend such as fences 1 and 2, access control building 3, guard towers 4, reactor building 5, administrative building 10, and radioactive waste storage 8. FIG. 2 represents the layout of a reactor building. The reactor building is accessed via doors 211 and 212 of the access control room 210, which may include a metal detector and a radiation detector. The reactor control room 220 includes equipment for monitoring and controlling the nuclear reactors. Although not illustrated, various sensor, monitoring, and control devices may be located near the research reactor 230.

Figure 3:
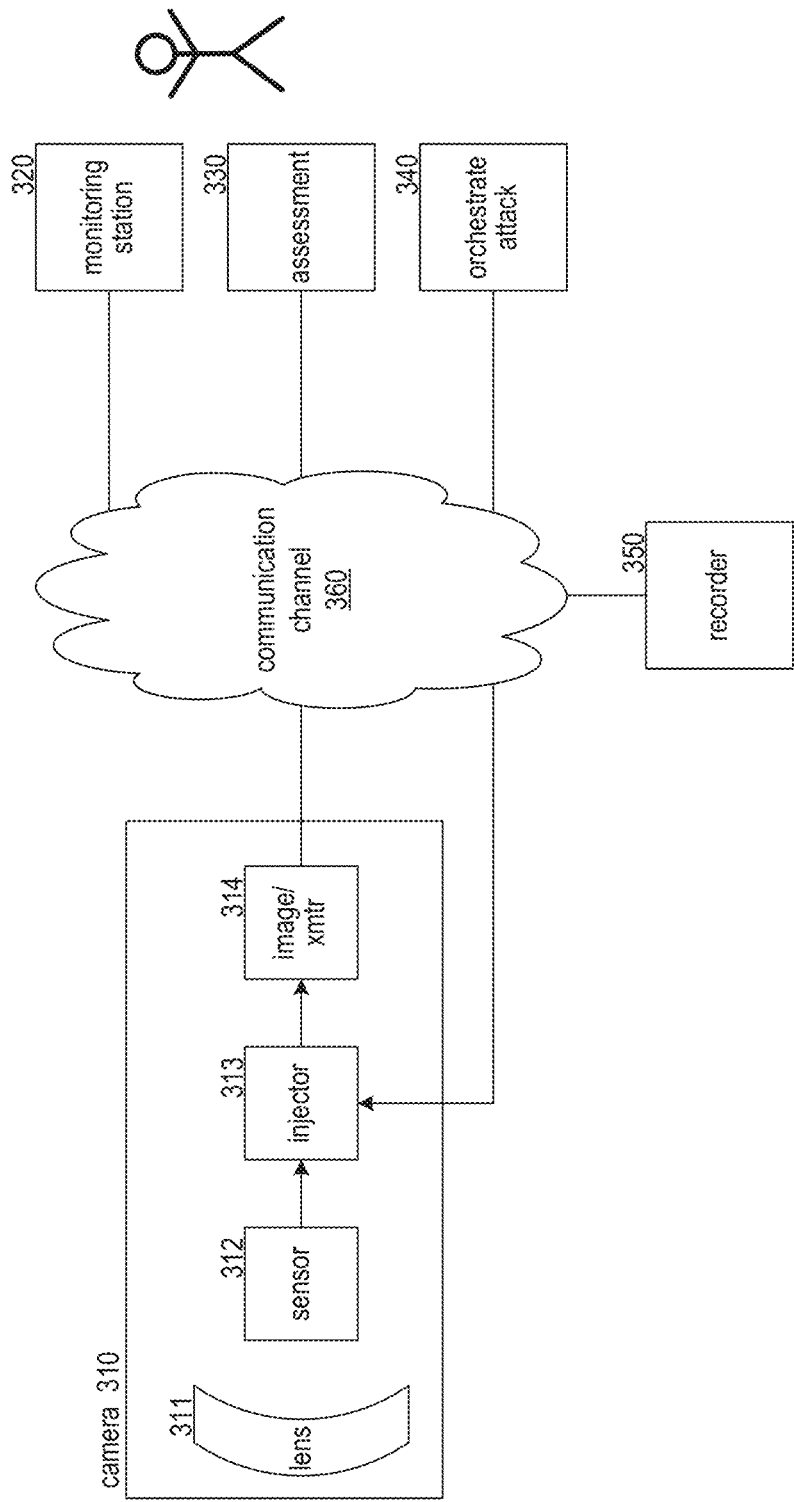
FIG. 3 is a block diagram that illustrates components of an ICS and an ICAS system in some embodiments.

FIG. 3 is a block diagram that illustrates components of an ICS and an ICAS system in some embodiments. The ICS includes a camera 310, a monitoring station 320, and a communication channel 360. The ICAS system include assessment component 330, an orchestrate attack component 340, and a recorder component 350. The camera includes a lens 311, an image sensor 312, an injector 313, and an image generator/transmitter 314. The lens focuses the light rays on the sensor which outputs signals representing the image. The image generator/transmitter component generates the image to transmit (e.g., from pixel representations), compresses the image (e.g., JPEG or MPEG format), and then transmits the image to the monitoring station. The injector component is configurable to output sensor signals received from the sensor or simulated sensor signals received via the communications channel. The configuration information may be provided to the injector component via the communication channel, which may be, for example, a local area network (LAN) or a virtual private network (VPN) overlaying a public network (e.g., the Internet). The monitoring station may be a physical monitoring station of a real facility or a training facility or a simulated monitoring station that provides a UI similar to that of a physical monitoring station.

The orchestrate attack component supports generating and implementing cyberattack scenarios. The orchestrate attack component may provide models to simulate the physics of a facility (e.g., pressure in a containment vessel), the function of devices (e.g., valves and cameras), sensor signals, control signals, and so on. The orchestrate attack component provides a UI through which a person can define a script with scenarios representing cyberattacks and non-cyberattacks. A scenario may specify the simulated data to send to various real or simulated devices and associated timing. The data may be predefined or generated dynamically (e.g., via simulated device). A scenario may reference a computer program that implements the scenario. The use of computer program to implement a scenario may allow for more complex scenarios (e.g., of arbitrary complexity) than can be generated using a scripting language.

The assessment component may be implemented on a computer that provides a UI to the operator. As the operator monitors the facility and takes actions, the recorder component may record data sent to devices from other devices or the monitoring station and data received at devices sent from other devices or the monitoring station. The recorder component may also record screenshots of the UI of the monitoring station and the operator's interaction with the monitoring station. The assessment component assesses the effectiveness of the operator's action based on the recorded data and provides a UI that presents feedback on the operator's performance. For example, the assessment component may compare the operator's response to a cyberattack to a desired or target response which may be specified as part of a scenario. The feedback may indicate the operator took an appropriate or an inappropriate response and provide the assessment of the response to the orchestrate attack component. If an inappropriate response is indicated, the UI may include an indication of the desired response. A script may specify actions to take based on the response such as go to the next scenario if the response was appropriate or replay the scenario if the response was inappropriate.

The computing systems on which the ICAS system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the ICAS system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The ICAS system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the ICAS system may be implemented in hardware using, for example, an application-specific integrated circuit (ASIC) or field programmable gate array ("FPGA").

The ICAS system may employ various machine learning techniques to assist in implementing and monitoring a simulated cyberattack. Training data may be collected from a real facility during normal operation or during a simulated cyberattack or generated manually. The data may include sensor readings, control signals, device states (e.g., valve open), and so on. The data (or changes in the data) may be collected periodically (e.g., every 30 seconds). The training data also includes any responses taken by the operator. The operator may respond to the data by taking appropriate responses or inappropriate responses. The training data may be represented by a feature vector for elements representing states of devices, data last sent to and received from a device, a response taken if any, and so on. The feature vectors may be labeled with an indication of whether the response is appropriate or inappropriate. A machine learning model (e.g., neural network) may be trained using the training data. The machine learning model can then be used to assess whether the response was appropriate given the current state of the devices, data sent and received, the response, and so on.

The machine learning model may be implemented as classifier or combination of classifiers including neural networks such as fully-connected, convolutional, recurrent, autoencoder, or restricted Boltzmann machine, a support vector machine, a Bayesian classifier, and so on. When the classifier is a deep neural network, the training results in a set of weights for the activation functions of the deep neural network. A support vector machine operates by finding a hyper-surface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface. This step allows for correct classification of data that is similar but not identical to the training data. Various techniques can be used to train a support vector machine.

Adaptive boosting may be used which is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function (RBF) network and a standard gradient descent as the search technique.

A convolutional neural network (CNN) may be employed to process image data. A CNN has multiple layers such as a convolutional layer, a rectified linear unit (ReLU) layer, a pooling layer, a fully connected (FC" layer, and so on. Some more complex CNNs may have multiple convolutional layers, ReLU layers, pooling layers, and FC layers. The 3D representation generator inputs a static image that does not change from iteration to iteration and outputs an initial 3D representation.

A convolutional layer may include multiple filters (also referred to as kernels or activation functions). A filter inputs a convolutional window, for example, of an image, applies weights to each pixel of the convolutional window, and outputs an activation value for that convolutional window. For example, if the static image is 256 by 256 pixels, the convolutional window may be 8 by 8 pixels. The filter may apply a different weight to each of the 64 pixels in a convolutional window to generate the activation value also referred to as a feature value. The convolutional layer may include, for each filter, a node (also referred to as a neuron) for each pixel of the image assuming a stride of one with appropriate padding. Each node outputs a feature value based on a set of weights for the filter that are learned by an optimizer that adjusts the weights after each iteration.

The ReLU layer may have a node for each node of the convolutional layer that generates a feature value. The generated feature values form a ReLU feature map. The ReLU layer applies a filter to each feature value of a convolutional feature map to generate feature values for a ReLU feature map. For example, a filter such as max(0, activation value) may be used to ensure that the feature values of the ReLU feature map are not negative.

The pooling layer may be used to reduce the size of the ReLU feature map by downsampling the ReLU feature map to form a pooling feature map. The pooling layer includes a pooling function that inputs a group of feature values of the ReLU feature map and outputs a feature value.

The FC layer includes some number of nodes that are each connected to every feature value of the pooling feature maps. Each node has a filter with its own set of weights that are adapted to the input data.

Although the upfront costs for generating a machine learning model may be high, the subsequent computational costs of using the machine learning model to classify data may be low. Also, a machine learning model can be used in real time and is less computationally expensive and may be more accurate than other techniques for classifying data. For example, rather than using a machine learning model for image classification, a classification technique could compare an image (e.g., 4096-by-4096 pixels) to a large database of sample images by generating a similarity score for each sample image based on pixel-by-pixel and pixel neighborhood comparisons to generate a similarity score for each sample image. Such a classification technique could then select a classification associated with the most similar image. The computational cost, however, of generating a similarity score for one sample image may be relatively high. Since the accuracy of the classification may increase with increased number of sample images, the computational cost needed to achieve the desired accuracy may be very high—much higher than using a trained machine learning model.

Figure 4:
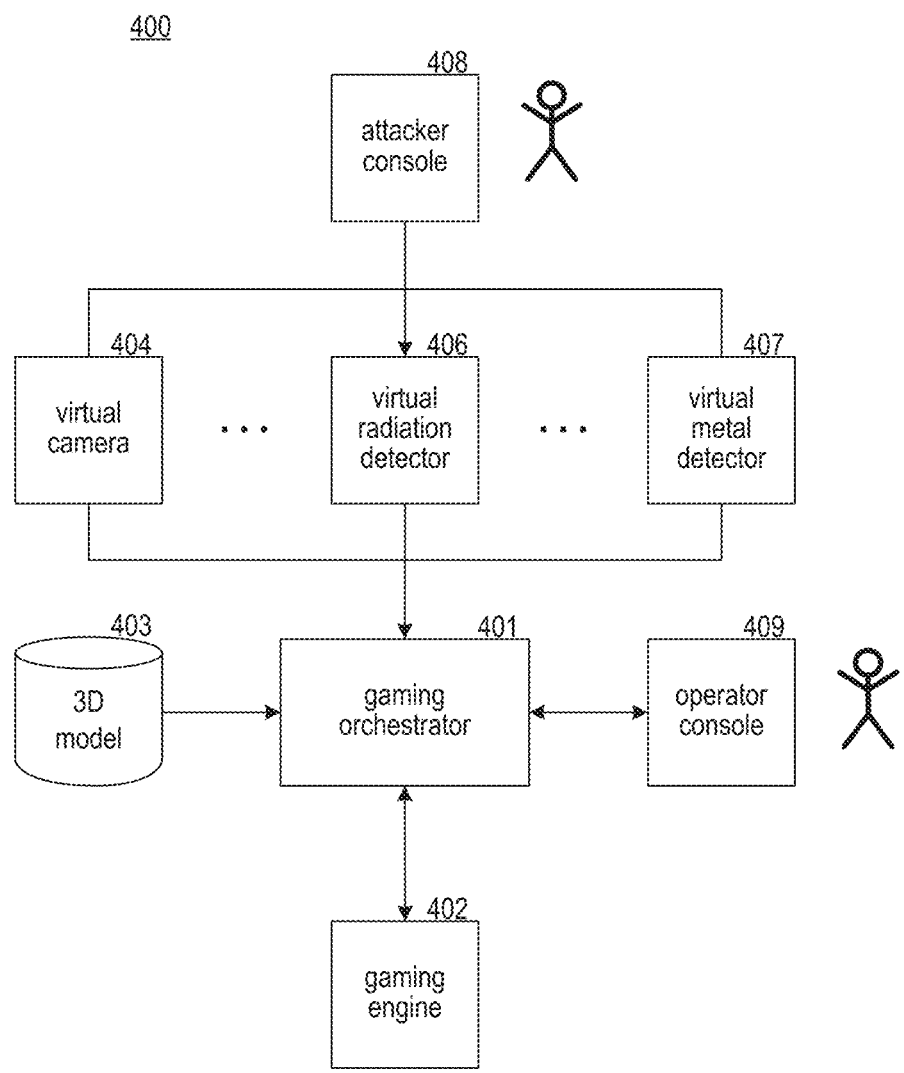
FIG. 4 is a block diagram that illustrates the architecture of a gaming system of the ICAS system.

FIG. 4 is a block diagram that illustrates the architecture of a gaming system of the ICAS system. The gaming environment 400 includes a gaming orchestrator component 401, a gaming engine 402, a 3D model of a facility (e.g., Shapash model), and simulated devices 404-407. An attacker may interact with the devices via an attacker console 408 to conduct a simulated cyberattack. An operator interacts with the gaming system via an operator console 409. The gaming orchestrator controls the playing of a game based on the 3D model and data received from and sent to the simulated devices. The operator console may provide a virtual reality (VR) or an augmented VR experience using a headset or may simulate a real management console. With an augmented VR experience the operator may move through a training facility with, for example, images of device displayed along with associated readouts when the operator is near and looking at a simulated or real device.

Figure 5:
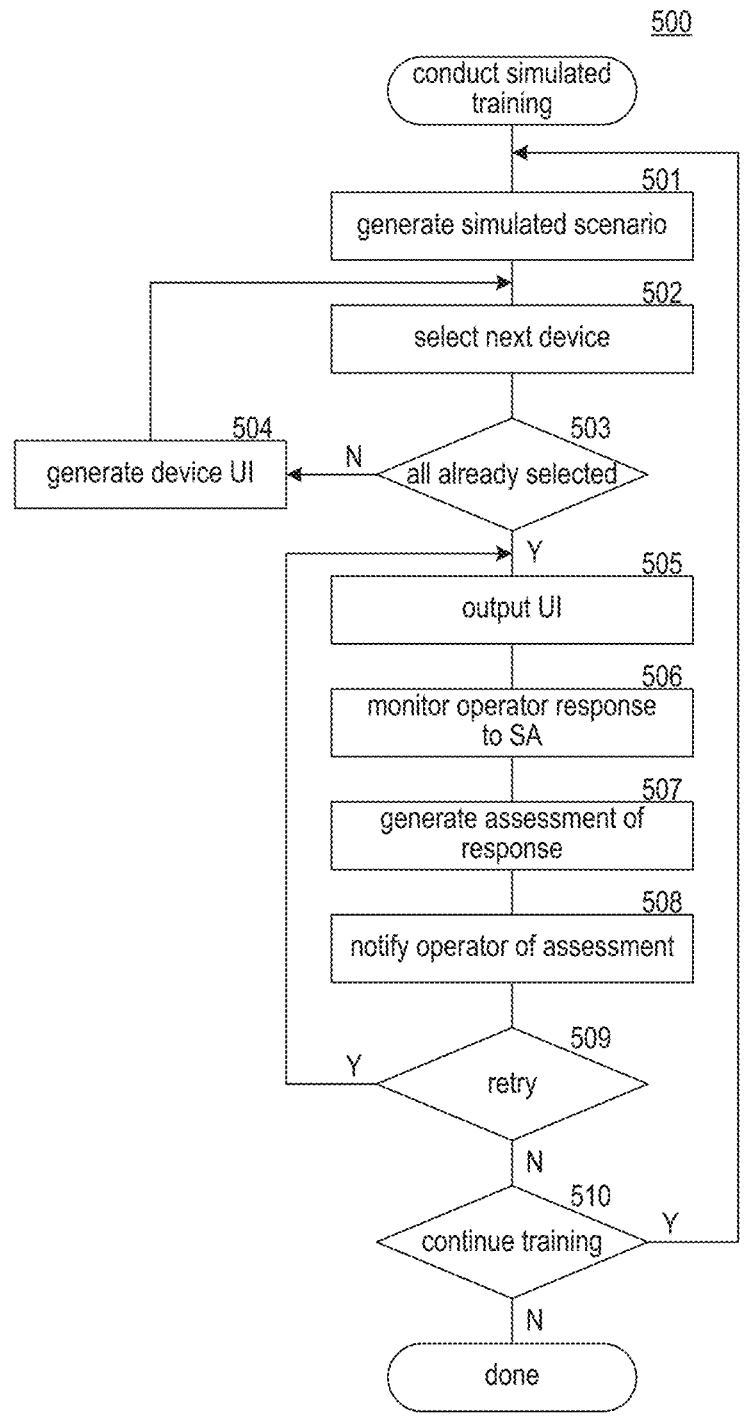
FIG. 5 is a flow diagram that illustrates the processing of a conduct simulated training component of an orchestrator component in some embodiments.

FIG. 5 is a flow diagram that illustrates the processing of a conduct simulated training component of an orchestrator component in some embodiments. The conduct simulated training component 500 controls the generating of scenarios (including a simulated cyberattack), implementing the scenarios in a simulated environment, and providing assessment of operator responses. In block 501, the component generates a scenario specification based in user input or accesses a predefined scenario specification based on simulated environment. In block 502, the component selects a device of the simulated environment. In decision block 503, if all the devices are already selected, then the component continues at block 505, else the component continues at block 504. In block 504, the component generates a UI for the device that, for example, includes readings collected from and state of the device and loops to block 502 to select the next device. In block 505, the component outputs the UIs to an operator (management or monitoring) console. In block 506, the component monitors the response of the operator. In block 507, the component generates an assessment of the response, for example, based on a target response indicated in the scenario specification. In block 508, the component notifies the operator of the assessment. In decision block 509, if the scenario specification indicates that scenario should be retried based on the assessment, then the component loops to block 505 to replay the scenario, else the component continues at block 510. In decision block 510, if the training is to continue, then the component loops to block 501 to process the next scenario, else the component completes.

Figure 6:
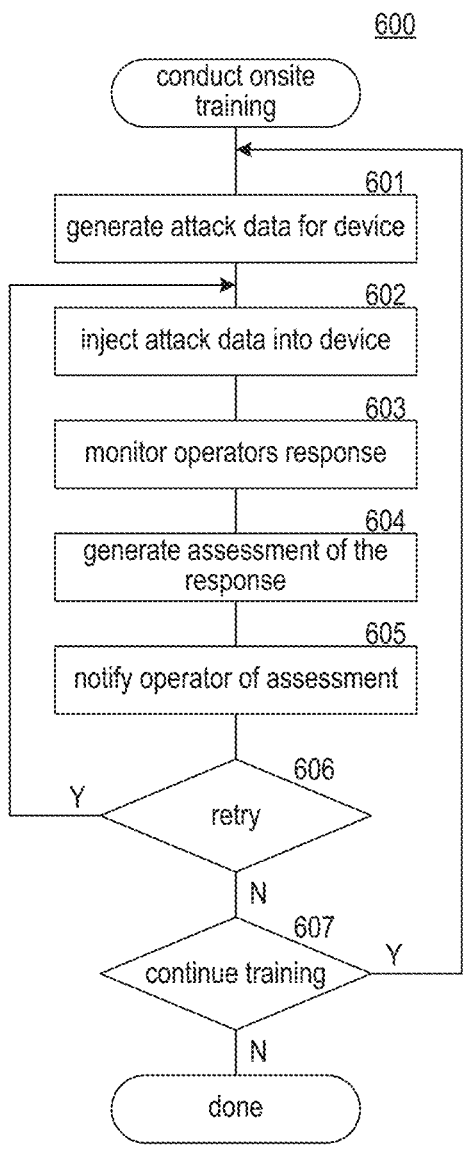
FIG. 6 is a flow diagram that illustrates the processing of a conduct onsite training component in some embodiments.

FIG. 6 is a flow diagram that illustrates the processing of a conduct onsite training component in some embodiments. The conduct onsite training component 600 controls a cyberattack against a single device. The component may be invoked multiple times for different devices. In block 601, the component generates attack data or accesses pre-defined attack data for a device. In block 602, the component injects the attack data into the device. In block 603, the component monitors the response of the operator. In block 604, the component generates an assessment of the response, for example, as specified in a scenario specification. In block 605, the component notifies the operator of the assessment.

In decision block 606, if a scenario specification indicates that the attack should be retried based on the assessment, then the component loops to block 602 to replay the attack, else the component continues at block 607. In decision block 607, if the training is to continue, then the component loops to block 601 to generate the next attack data, else the component completes.

The following paragraphs describe various embodiments of aspects of the ICAS system. An implementation of the ICAS system may employ any combination of the embodiments. The processing described below may be performed by a computing device with a processor that executes computer-executable instructions stored on a computer-readable storage medium that implements the ICAS system.

In some embodiments, a method performed by one or more computing systems is provided for simulating a cyberattack. The method generates simulated sensor signals that are representative of sensor signals generated by a sensor of a sensor device that is the target of the simulated cyberattack. The method injects the simulated sensor signals into the sensor device so that the device generates an output based on the simulated sensor signals. The method generates a user interface based on the generated output. In some embodiments, the sensor device is a device of an industrial control system. In some embodiments, the user interface is generated by a monitoring system for monitoring the industrial control system. In some embodiments, the industrial control system includes a plurality of sensor devices and further comprises executing a script that indicates simulated sensor signals to send to multiple sensor devices. In some embodiments, the sensor device is adapted to selectively process simulated sensor signals or sensor signals output by the sensor. In some embodiments, the simulated cyberattack represents a third-party taking control of the sensor device. In some embodiments, the method further generates simulated output of a simulated sensor device and generates the user interface based on the simulated output.

In some embodiments, a method performed by one or more computing systems is provided for simulating a cyberattack. The method accesses simulated output of a sensor device type that is a target of the simulated cyberattack. The simulated output is representative of output generated by a sensor device of the sensor device type. The method sends the simulated output to a monitoring system. The simulated output is sent in a format that is used by a sensor device of the sensor device type to send output to the monitoring system. The method generates a user interface based on the simulated output. In some embodiments, the simulated output is an image based on a packet format and compression type used by a sensor device of the sensor device type. In some embodiments, the real output of the sensor device is intercepted and not sent to the monitoring system. In some embodiments, the sensor device type is of a sensor device of an industrial control system. In some embodiments, the user interface is generated by a monitoring system for monitoring the industrial control system. In some embodiments, the method further executes a script that indicates simulated output and timing of sending the output. In some embodiments, the method further generates simulated sensor signals that are representative of sensor signals generated by a sensor of a second sensor device that is a target of the simulated cyberattack and injects the simulated sensor signals into the second sensor device so that the second sensor device generates second output based on the simulated sensor signals and sends the second output to a monitoring system.

In some embodiments, a method performed by one or more computing systems is provided for simulating a cyberattack in a gaming environment. The method accesses a 3D representation of a facility that has simulated devices. The method provides the 3D representation to a gaming engine to generate a display based on simulated movement through the facility. When a user interface of a monitoring system is to be visible based on the movement, the method provides a simulated representation of the user interface to the gaming engine for display. The simulated representation may be based on a simulated cyberattack targeting a simulated device. In some embodiments, a simulated representation includes data resulting from the simulated cyberattack on a first simulated device of the facility and data resulting from normal operation of a second simulated device of the facility.

In some embodiments, a method performed by one or more computing systems is provided for simulating a cyberattack on a facility. The method generates simulated control signals that are representative of control signals generated by a control system for controlling a device of the facility. The simulated control signals represent effects of the simulated cyberattack on the device. The method sends the simulated control signals to the device to simulate the effects of the simulated cyberattack. In some embodiments, the device includes a selection component for selecting simulated control signals or real control signals based on configuration of the device. In some embodiments, the device receives the simulated control signals via an input connection through which the device receives real control signals. In some embodiments, the device is a simulated device. In some embodiments, the facility is an industrial facility or a medical facility. In some embodiments, a monitoring system provides a user interface that indicates the effects of the simulated cyberattack.

In some embodiments, a method performed by one or more computing systems is provided for simulating a cyberattack. The method generates simulated sensor signals that are representative of sensor signals generated by a sensor that has been a target of the simulated cyberattack. The method sends the simulated sensor signals to a real device that inputs the simulated sensor signals and generates an output based on the simulated sensor signals. The method monitors for a response of an operator to the output of the real device. The method determines whether the response (if any) indicates that the operator is cognizant of the cyberattack. In some embodiments, the determination includes comparing the response to desired responses to the cyberattack. In some embodiments, the sensor is a camera and the simulated sensor signals are images representative of images that would be output during a cyberattack on the camera. In some embodiments, the simulated sensor signals are generated using a model of an environment in which the sensor senses characteristics of the environment. In some embodiments, the simulated sensor signals are based on sensor signals collected during a real cyberattack. In some embodiments, the determining further assesses effectiveness of the response.

In some embodiments, a method performed by one or more computing systems is provided for simulating a real cyberattack. The method generates simulated data representative of the real cyberattack on a real electronic device. The method injects the simulated data into the electronic device so that the electronic device operates as if the simulated data was real data generated during a cyberattack. The method monitors for countermeasures taken in response to operation of the electronic device. The method assesses effectiveness of the countermeasures to the simulated cyberattack. In some embodiments, the simulated data is data collected based on a real cyberattack. In some embodiments, the assessing of the effectiveness is based on comparison of the countermeasures to target countermeasures. In some embodiments, the countermeasures are taken by a person. In some embodiments, the countermeasures are taken by a cybersecurity system.

In some embodiments, one or more computer-readable storage mediums are provided that store instructions for controlling one or more computing systems to simulate a cyberattack on an industrial control system (ICS) of a facility to perform a method. The method generates simulated sensor signals that are representative of sensor signals generated by a sensor of a sensor device of the ICS that is the target of the simulated cyberattack. The method injects the simulated sensor signals into the sensor device so that the device generates an output based on the simulated sensor signals. The method generates a user interface based on the generated output. The user interface is used for monitoring the ICS. In some embodiments, the ICS includes a plurality of sensor devices and wherein the method includes executing a script that indicates simulated sensor signals to send to multiple sensor devices. In some embodiments, the sensor device is adapted to selectively process simulated sensor signals or sensor signals output by the sensor.

In some embodiments, one or more computing systems are provided for simulating a cyberattack on a facility. The one or more computing systems include one or more computer-readable storage mediums that store computer-executable instructions for controlling the one or more computing systems and one or more processors for executing the computer-executable instructions stored in the one or more computer-readable storage mediums. The instructions include instructions to generate simulated control signals that are representative of control signals generated by a control system for controlling a device of the facility. The simulated control signals represent effects of the simulated cyberattack on the device. The instructions send the simulated control signals to the device to simulate the effects of the simulated cyberattack. In some embodiments, the device includes a selection component for selecting simulated control signals or real control signals based on configuration of the device. In some embodiments, the device receives the simulated control signals via an input connection through which the device receives real control signals. In some embodiments, the device is a simulated device. In some embodiments, the facility is an industrial facility. In some embodiments, the facility is a medical facility.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by one or more computing systems for simulating a cyberattack, the method comprising:
generating simulated sensor signals that are representative of sensor signals generated by a sensor of a sensor device that is the target of the simulated cyberattack;
injecting the simulated sensor signals into the sensor device so that the device generates an output based on the simulated sensor signals; and
generating a user interface based on the generated output.

2. The method of claim 1 wherein the sensor device is a device of an industrial control system.

3. The method of claim 2 wherein the user interface is generated by a monitoring system for monitoring the industrial control system.

4. The method of claim 2 wherein the industrial control system includes a plurality of sensor devices and further comprising executing a script that indicates simulated sensor signals to send to multiple sensor devices.

5. The method of claim 1 wherein the sensor device is adapted to selectively process simulated sensor signals or sensor signals output by the sensor.

6. The method of claim 1 wherein the simulated cyberattack represents a third-party taking control of the sensor device.

7. The method of claim 1 further comprising generating simulated output of a simulated sensor device and generating the user interface based on the simulated output.

8. A method performed by one or more computing systems for simulating a cyberattack, the method comprising:
accessing simulated output of a sensor device type that is a target of the simulated cyberattack, the simulated output being representative of output generated by a sensor device of the sensor device type;
sending the simulated output to a monitoring system, the simulated output sent in a format that is used by a sensor device of the sensor device type to send output to the monitoring system; and
generating a user interface based on the simulated output.

9. The method of claim 8 wherein the simulated output is an image based on a packet format and compression type used by a sensor device of the sensor device type.

10. The method of claim 8 wherein real output of the sensor device is intercepted and not sent to the monitoring system.

11. The method of claim 8 wherein the sensor device type is of a sensor device of an industrial control system.

12. The method of claim 11 wherein the user interface is generated by a monitoring system for monitoring the industrial control system.

13. The method of claim 8 further comprising executing a script that indicates simulated output and timing of sending the simulated output.

14. The method of claim 8 further comprising generating simulated sensor signals that are representative of sensor signals generated by a sensor of a second sensor device that is a target of the simulated cyberattack and injecting the simulated sensor signals into the second sensor device so that the second sensor device generates second output based on the simulated sensor signals and sends the second output to a monitoring system.

15. A method performed by one or more computing systems for simulating a cyberattack in a gaming environment, the method comprising:
accessing a 3D representation of a facility, the facility having simulated devices;
providing the 3D representation to a gaming engine to generate a display based on simulated movement through the facility; and
when a user interface of a monitoring system is to be visible based on the movement, providing a simulated representation of the user interface to the gaming engine for display, the simulated representation based on a simulated cyberattack targeting a simulated device.

16. The method of claim 15 wherein a simulated representation includes data resulting from the simulated cyberattack on a first simulated device of the facility and data resulting from normal operation of a second simulated device of the facility.

17. A method performed by one or more computing systems for simulating a cyberattack on a facility, the method comprising:
generating simulated control signals that are representative of control signals generated by a control system for controlling a device of the facility, the simulated control signals for representing effects of the simulated cyberattack on the device; and
sending the simulated control signals to the device to simulate the effects of the simulated cyberattack.

18. The method of claim 17 wherein the device includes a selection component for selecting simulated control signals or real control signals based on configuration of the device.

19. The method of claim 17 wherein the device receives the simulated control signals via an input connection through which the device receives real control signals.

20. The method of claim 17 wherein the device is a simulated device.

21. The method of claim 17 wherein the facility is an industrial facility.

22. The method of claim 17 wherein the facility is a medical facility.

23. The method of claim 17 wherein a monitoring system provides a user interface that indicates the effects of the simulated cyberattack.

24. A method performed by one or more computing systems for simulating a cyberattack, the method comprising:
generating simulated sensor signals that are representative of sensor signals generated by a sensor that has been a target of the simulated cyberattack;
sending the simulated sensor signals to a real device that inputs the simulated sensor signals and generates an output based on the simulated sensor signals;
monitoring for a response of an operator to the output of the real device; and
determining whether the response indicates that the operator is cognizant of the cyberattack.

25. The method of claim 24 wherein the determining includes comparing the response to desired responses to the cyberattack.

26. The method of claim 24 wherein the sensor is a camera and the simulated sensor signals are images representative of images that would be output during a cyberattack on the camera.

27. The method of claim 24 wherein the simulated sensor signals are generated using a model of an environment in which the sensor senses characteristics of the environment.

28. The method of claim 24 wherein the simulated sensor signals are based on sensor signals collected during a real cyberattack.

29. The method of claim 24 wherein the determining further assesses effectiveness of the response.

30. A method performed by one or more computing systems for simulating a real cyberattack, the method comprising:
generating simulated data representative of the real cyberattack on a real electronic device;
injecting the simulated data into the electronic device so that the electronic device operates as if the simulated data was real data generated during a cyberattack;
monitoring for countermeasures taken in response to operation of the electronic device; and
assessing effectiveness of the countermeasures to the simulated cyberattack.

31. The method of claim 30 wherein the simulated data is data collected based on a real cyberattack.

32. The method of claim 30 wherein the assessing of the effectiveness is based on comparison of the countermeasures to target countermeasures.

33. The method of claim 30 wherein the countermeasures are taken by a person.

34. The method of claim 30 wherein the countermeasures are taken by a cybersecurity system.

35. One or more computer-readable storage mediums storing instructions for controlling one or more computing systems to simulate a cyberattack on an industrial control system (ICS) of a facility to perform a method comprising:
generating simulated sensor signals that are representative of sensor signals generated by a sensor of a sensor device of the ICS that is the target of the simulated cyberattack;
injecting the simulated sensor signals into the sensor device so that the device generates an output based on the simulated sensor signals; and
generating a user interface based on the generated output, the user interface used for monitoring the ICS.

36. The one or more computer-readable storage mediums of claim 35 wherein the ICS includes a plurality of sensor devices and wherein the method includes executing a script that indicates simulated sensor signals to send to multiple sensor devices.

37. The one or more computer-readable storage mediums of claim 35 wherein the sensor device is adapted to selectively process simulated sensor signals or sensor signals output by the sensor.

38. One or more computing systems for simulating a cyberattack on a facility, the one or more computing systems comprising:
one or more computer-readable storage mediums that store computer-executable instructions for controlling the one or more computing systems to:
generate simulated control signals that are representative of control signals generated by a control system for controlling a device of the facility, the simulated control signals for representing effects of the simulated cyberattack on the device; and
send the simulated control signals to the device to simulate the effects of the simulated cyberattack; and
one or more processors for executing the computer-executable instructions stored in the one or more computer-readable storage mediums.

39. The one or more computing systems of claim 38 wherein the device includes a selection component for selecting simulated control signals or real control signals based on configuration of the device.

40. The one or more computing systems of claim 38 wherein the device receives the simulated control signals via an input connection through which the device receives real control signals.

41. The one or more computing systems of claim 38 wherein the device is a simulated device.

42. The one or more computing systems of claim 38 wherein the facility is an industrial facility.

43. The one or more computing systems of claim 38 wherein the facility is a medical facility.

* * * * *